United States Patent

Cracknell et al.

Patent Number: 5,414,103
Date of Patent: May 9, 1995

[54] POLYETHER PHOSPHATE ESTERS

[75] Inventors: Robert B. Cracknell, Lymington; Anthony J. Moore, Camberley, both of England

[73] Assignee: Oceanfloor Limited, Southampton, England

[21] Appl. No.: 997,224

[22] Filed: Dec. 28, 1992

[30] Foreign Application Priority Data

Jan. 10, 1992 [GB] United Kingdom ............... 9200501

[51] Int. Cl.$^6$ .................. C07F 9/09; C10M 145/38
[52] U.S. Cl. ........................ 558/90; 558/92; 558/100; 558/158; 558/186; 252/49.8
[58] Field of Search ............ 558/92, 100, 158, 186, 558/90; 252/49.8

[56] References Cited

U.S. PATENT DOCUMENTS

| | | | |
|---|---|---|---|
| 3,275,667 | 9/1966 | Bohunek | 554/78 |
| 3,567,636 | 3/1971 | Katzenstein | 252/32.5 |
| 3,755,503 | 8/1973 | Stanford et al. | 558/158 |
| 4,800,229 | 1/1989 | Papalos | 558/92 |
| 4,830,764 | 5/1989 | Wiedmann | 252/8.6 |

FOREIGN PATENT DOCUMENTS 0355977 2/1990 European Pat. Off. .
0524783 1/1993 European Pat. Off. .

*Primary Examiner*—P. Achutamurthy
*Attorney, Agent, or Firm*—Brooks Haidt Haffner & Delahunty

[57] ABSTRACT

A polyalkylene glycol ether phosphate ester, or salt thereof, having the formula:

$$R_w\text{—P(O)(OH)}_{3-w} \qquad (I)$$

wherein w is an integer from 1 to 3, and
R is an oil-soluble polyether moiety having the formula:

$$R^1 X[(C_xH_{2x}O)_n(C_yH_{2y}O)_p]_m \qquad (II)$$

wherein $R^1$ is either an alkyl or an alkyl phenyl group having from 7 to 30 carbon atoms,
X is either O, S, or N
x is an integer from 2 to 4,
y is an integer from 6 to 30,
m is 1 when X is O or S and m is 2 when X is N,
n and p are such that the polyether moiety contains between 1 and 35% by weight of $(C_yH_{2y}O)$ units and between 35 and 80% by weight of $(C_xH_{2x}O)$ units, and the molecular weight of the polyalkylene glycol moiety is between 500 and 5000 is disclosed, The phosphate ester can be prepared by reacting a polyether with a phosphating agent, e.g. phosphorus pentoxide and water. Lubricating oil compositions comprising the phosphate ester or salt thereof are also disclosed. The phosphate esters and salts thereof are useful as extreme pressure/anti-wear additives.

17 Claims, No Drawings

POLYETHER PHOSPHATE ESTERS

The present invention relates to novel polyether derivatives and to lubricating oil compositions containing them.

Lubricating oil compositions, whether for automotive, marine, industrial or hydraulic applications, generally contain a number of additives in addition to the base fluid. Thus, for example, automotive lubricating oil compositions generally contain a viscosity index improver (VII) and a dispersant and/or a detergent additive, at least. Another additive commonly employed is an extreme pressure (EP)/antiwear additive, generally in the form of a zinc dialkyldithiophosphate (ZDTP).

Polyethers are well-known as components of lubricating oil compositions. Thus, Japanese Kokai 50/133205 discloses a lubricating oil composition in which polyoxyalkylene glycol ethers of general formula (1) and/or (2):

(1)

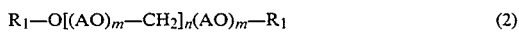
(2)

(where $R_1$ and $R_2$ are hydrogen or $C_1$ to $C_{24}$ straight chain or branched hydrocarbon groups, m is 1-100, n is an integer in the range 1-50, AO is an oxyalkylene group, A is a $C_pH_{2p}$ alkylene group, p being an integer in the range 2-26, and the ratio number of carbon atoms/number of oxygen atoms in the molecule is made 3.5-9.5 by copolymerization with one or more 8-26C alpha-olefin oxides as (AO)) are mixed with mineral oil of lubricating viscosity. The use of polyethers according to the invention of the Japanese Kokai are said to lead to better solubility in mineral oil than conventional polyethylene glycol, polypropylene glycol and polyethylene/polypropylene glycol and to provide superior viscosity index improvement and pour point depression characteristics as compared with conventional viscosity index improvers, such as polymethacrylate and polybutene, for example.

Subsequent patent publications, for example EP-A-0355977, have addressed a problem associated with polyethers, namely that of improving their compatibility with mineral oils.

Our unpublished European application No. 92306593.2 provides the use of a lubricating oil as an inlet-valve deposit inhibitor characterized in that the lubricating oil comprises a polyether of the formula

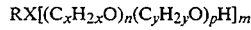

wherein R is either an alkyl or alkyl phanyl group having from 7 to 30 carbon atoms,
X is selected from O, S or N, or RX together represents H,
x is an integer from 2 to 4,
y is an integer from 6 to 30,
m is 1 when X is O or S or when RX together represents H, or m is 2 when X is N, and
n and p are such that the polyether contains between 0 and 40% by weight of $(C_yH_{2y}O)$ units and between 35 and 80% by weight of $(C_xH_{2x}O)$ units.

The use of lubricating oil additives is not without its disadvantages. Thus, for example the use of some viscosity index improvers can increase the deposits on the inlet valves of engines and thereby impair their efficiency. The use of ZDTPs as EP/antiwear additives can lead to ash formation. In addition, zinc-based products are coming to be regarded as environmentally unfriendly and it is likely that zinc-free products will become more popular within the lubricating oil industry. A general problem with the prior art to be solved then is that of providing improved lubricating oil compositions and a particular problem is that of providing improved zinc-free EP/antiwear additives. The present invention solves both the general and the particular prior art problems by the provision of novel oil soluble polyalkylene glycol ether phosphate esters.

Polyalkylene glycol ether phosphate esters have been previously disclosed, e.g. in U.S. Pat. No. 3,567,636. However, these phosphate esters comprise short chain polyoxyalkylene chains which are based on low molecular weight alkylene oxide units, e.g. ethylene oxide and/or propylene oxide and therefore have limited solubility in lubricating oils.

In summary, the phosphate esters of the present invention provide novel oil-soluble polyalkylene glycol ether phosphate esters having EP/anti-wear properties.

Accordingly, the present invention provides a polyalkylene glycol ether (also hereinafter referred to as polyether) phosphate ester, or salt thereof, having the formula:

(I)

wherein w is an integer from 1 to 3, and
R is an oil-soluble polyether moiety having the formula:

(II)

wherein $R^1$ is either an alkyl or an alkyl phenyl group having from 7 to 30 carbon atoms,
X is either O, S, or N,
x is an integer from 2 to 4,
y is an integer from 6 to 30,
m is 1 when X is O or S and m is 2 when X is N,
n and p are such that the polyether moiety contains between 1 and 35% by weight of $(C_yH_{2y}O)$ units and between 35 and 80% by weight of $(C_xH_{2x}O)$ units, and the molecular weight of the polyalkylene glycol moiety is between 500 and 5000.

The phosphate esters can be in the form of their salts, e.g. amine salts or alkali or alkaline earth metal salts.

In the formula (I) w is preferably either 1 to 2.

In the formula (II) $R^1$ is either an alkyl or an alkyl phenyl group having from 7 to 30 carbon atoms. When $R^1$ is an alkyl group it is preferably a $C_{10}$ to $C_{24}$ alkyl group, such as may be obtained from the corresponding fatty acid alcohol, thiol or amine. Of the alkyl groups, most preferred are alkyl groups having from 12 to 18 carbon atoms. In the case where $R^1$ is alkyl phenyl, $R^1$ preferably has from 9 to 30 carbon atoms, with phenyl groups substituted with one or more $C_6$ to $C_{12}$ alkyl groups being most preferred. Particularly preferred are phenyl groups substituted with two $C_6$ to $C_{12}$ alkyl groups.

X in the formula (II) can be O, S, or N. Preferably X is O and $R^1X$ is derived from a phenol, for example, dinonyl phenol, or an alcohol, for example, A $C_{12}$–$C_{14}$ linear secondary alcohol. On the other hand, $R^1X$ can be derived from a thiol or an amine.

In addition to the moiety $R^1$ and the group X the polyether of the formula (II) is comprised of an oxyalkylene backbone chain or chains of formula $[(C_xH_{2x}O)_n(C_yH_{2y}O)_p]$. Such backbone chains can be created by alkoxylating a starter molecule of formula $R^1X(H)_m$ with at least two alkylene oxides. The two or more alkylene oxides can be reacted with the starter molecule consecutively or simultaneously. In the case where the starter molecule is alkoxylated with the alkylene oxides consecutively, the alkylene oxides will be distributed as blocks in the backbone chains or, very much more preferred, by alkoxylating the starter molecule with a mixture of alkylene oxides, i.e. simultaneously they will be distributed randomly in the backbone chain. For each of the two types of alkylene oxide, $C_xH_{2x}O$ and $C_yH_{2y}O$, one or more different alkylene oxides can be used. The only constraint is that in the final polyether, the total number of units having the formula $C_xH_{2x}O$ is between 35 and 80%, preferably between 40 and 80%, more preferably between 50 and 75% by weight and the total number of units having the formula $C_yH_{2y}O$ is between 1 and 35%, preferably between 5 and 25% by weight.

It is preferred that the units of formula $(C_xH_{2x}O)$ are mainly, i.e. greater than 50 mole%, comprised of oxypropylene $(C_3H_6O)$ units. Most preferred are those polyethers where the $C_xH_{2x}O$ groups are exclusively oxypropylene. As regards the $(C_yH_{2y}O)$ units, these are preferably such that y is in the range from 10 to 20, preferably 12 to 16, e.g. 12 or 16. A preferred $(C_yH_{2y}O)$ unit is derived from hexadecene -1-oxide, i.e. $y=16$ The polyether moiety, as defined above has a molecular weight in the range 500 to 5000, preferably from 700 to 3000, more preferably in the range from 800 to 2500. For the avoidance of doubt the term 'molecular weight' as applied to polyethers throughout this specification refers to the weight average molecular weight as measured by Gel Permeation Chromatography using polystyrene standards.

Preferred polyether phosphate esters include those of the formula (I) wherein w is either 1 or 2 and R is an oil-soluble polyether moiety of the formula (II) wherein
$R^1$ is a mono/di alkyl phenyl, preferably dinonyl phenyl,
X is 0,
x is 3,
y is 16,
m is 1,
n is 30±3,
p is 1.3±0.3
the molecular weight is in the range from 1900 to 2700, and $(C_xH_{2x}O)$ and $(C_yH_{2y}O)$ are randomly distributed in the backbone chain,
and mixtures of the aforesaid polyether phosphate esters.

In another aspect the present invention provides a process for the production of a polyether phosphate ester of the formula (I), or a mixture thereof, which process comprises reacting at elevated temperature a polyether having the formula:

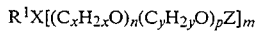

(wherein $R^1$, X, x, y, m, n and p are the same as in the formula (II) and X is either hydrogen or a hydrocarbyl group containing from 1 to 30 carbon atoms)
with a phosphating agent, for example, phosphorus pentoxide, $(P_2O_5)$, polyphosphoric acid (a liquid mixture of $P_2O_5/H_3PO_4$), phosphoric acid $(H_3PO_4)$ or phosphorus oxychloride $(POCl_3)$ and water in a molar ratio such that the formation of polyalkylene glycol pyrophosphate is substantially avoided.

With regard to the polyether having the formula (III), Z is either hydrogen or a hydrocarbyl group containing from 1 to 30, preferably hydrogen. Suitably the hydrocarbyl group is either an alkyl or an aryl group, preferably containing from 1 to 12 carbon atoms. More preferred are alkyl groups containing from 1 to 3 carbon atoms, with methyl or ethyl groups being most preferred.

Of the phosphating agents the preferred compounds are phosphorus pentoxide and polyphosphoric acid.

The polyether is suitably reacted with the phosphating agent followed by hydrolysis with water at a polyether:phosphating agent:water molar ratio less than 1:[1:1], preferably less than 1:[2:2].

In particular, it is important that the phosphating agent is used in an amount such that the polyether to phosphating agent molar ratio is less than 1:1, i.e. the phosphating agent is in molar excess, preferably less than 1:2.

The elevated temperature employed may suitably be in the range from 70° to 120° C., preferably from 90° to 110° C.

A preferred process comprises reacting a polyether having the formula (I), wherein $R^1$ is dinonylphenyl, X is oxygen, x is 3, y is 16, m is 1, n is 27 to 33 and p is from 1.0 to 1.6, with phosphorus pentoxide, followed by water to hydrolyse any polyether pyrophosphates at a temperature in the range from 70° to 120° C., the molar ratio of polyether:phosphorus compound:water being less than 1:[1:1]. This generally gives a product that is a mixture of the polyether monoester and diester of phosphoric acid, unreacted polyether, and phosphoric acid. It is desirable to remove the phosphoric acid impurity, as phosphoric acid is detrimental to the performance of the product, particularly with respect to its corrosivity.

The removal of phosphoric acid can be achieved by the dissolution of the crude product in a suitable solvent, such as toluene, followed by repeated water washing. After settling/separation, which can be facilitated by the addition of butanol, the water layer is discarded. Removal of the solvent by distillation affords the purified product.

Generally, the process of the invention will produce a product comprising a mixture of the monoester, the diester, unreacted polyether and traces of phosphoric acid.

In a final aspect of the present invention there is provided a lubricating oil composition comprising an oil of lubricating viscosity and an EP/antiwear improving amount of a polyether phosphate ester, or salt thereof, of the formula (I), wherein R, w, $R^1$, X, x, n, y, p and m are all as defined above but with the proviso that n and p are such that the polyether moiety contains between 0 and 35%, preferably 1 and 35% by weight of $(C_yH_{2y}O)$ units and between 35 and 80% by weight of $(C_xH_{2x}0)$ units. It is preferred that n is at least 10, preferably at least 20, e.g. in the range 20-40.

The oil of lubricating viscosity may be any oil capable of being used in automotive, marine, industrial or hydraulic lubricants. Suitable oils of lubricating viscosity include (i) mineral oils, (ii) hydrocracked mineral oils, (iii) oil-soluble polyalkylene glycols, (iv) polyol esters, (v) diesters of dibasic acids or polyesters of polybasic acids, (vi) polyalphaolefins and (vii) conventional polyalkylene glycols. Suitable mineral oils include naphthenic and paraffinic oils. A suitable hydrocracked mineral oil is Lavera Hydrocracker residue (LHC) obtainable from BP Oil. Suitable diesters or polyesters include dioctyl adipate, dioctyl sebacate and tridecyladipate. Suitable polyalphaolefins include liquid polyisobutenes, for example the Hyvis range obtainable from BP Chemicals Limited, and oligomers of decene-1.

Additives such as viscosity index improvers, pour point depressants, detergents, dispersants, antioxidants, anti-corrosion agents, metal passivators, additional EP-/antiwear agents and antifoam agents may optionally be added to the compositions.

The polyether phosphate ester, or mixture thereof, may suitably be present in the lubricating oil composition in an amount such that the phosphorus content of the composition is in the range from 0.003 to 0.6, preferably from 0.005 to 0.15, for example, from 0.015 to 0.15, more preferably from 0.01 to 0.12% (weight/weight).

The invention will now be illustrated by reference to the following Examples.

(A) Preparation of Esters

EXAMPLE 1

An oil soluble polyether (OSP) (a polyether of the formula (III) wherein $R^1X$ is dinonylphenol, $C_xH_{2x}O$ is propylene oxide, $C_yH_{2y}O$ is hexadec-1-ene oxide, n is $30\pm3$, p is $1.3\pm0.3$ and $Z=H$ giving a composition $73\pm4\%$ propylene oxide, $13\pm4\%$ hexadec-1-ene oxide and $14\pm2\%$ dinonylphenol (302 g) was heated, with stirring, under a nitrogen atmosphere to 120° C. for 1 hour. It was allowed to cool to 90° C., and then phosphorus pentoxide (21.5 g) was added in four approximately equal portions over 30 minutes. At the end of these additions the temperature was 100° C. The mixture was heated at 110° C. for 3 hours, then allowed to cool to 90° C. Water (0.5 g) was added and the reaction mixture heated at 90° C. for 1 hour. The product was filtered to give a brown viscous liquid (305 g).

Product Analysis

Phosphorus = 2.75% (w/w)

Total Acid Number = 15.4 mg KOH/g

Analysis by $^{31}$Pnmr showed the product to be a mixture of:

| mono- and di-phosphate ester | 60 ± 10% (w/w) |
| pyrophosphates | 20 ± 10% (w/w) |
| phosphoric acid | 20 ± 10% (w/w) |

It can be seen by reference to Table 3 that the polyether phosphate ester gives comparable performance to the commercial EP/antiwear additives.

EXAMPLE 2

The synthesis was similar to that in Example 1, except that 2.7 g of water was used to hydrolyse the reaction product, which was also a brown viscous liquid.

Product Analysis

Phosphorus = 2.80% w/w

Total Acid Number = 51 mg KOH/g

Analysis by $^{31}$p nmr showed the phosphorus in the product to be present as a mixture of:

| mono- and di-phosphate esters | 60 ± 10% (w/w) |
| phosphoric acid | 40 ± 10% (w/w) |

EXAMPLE 3

The OSP Phosphate synthesized in Example 2 (50 g), was dissolved in toluene (50 g) and the resulting solution washed with water (30 g). After settling/separation the water layer was discarded. The wash was repeated and the toluene removed to give a brown viscous liquid.

Product Analysis

Phosphorus = 1.40% (w/w)

Analysis by $^{31}$P nmr showed the phosphorus in the product to be present as a mixture of:

| mono- and di-phosphate esters | 95 ± 5% (w/w) |
| phosphoric acid | 5 ± 5% (w/w) |

EXAMPLE 4

A mixture of the oil soluble polyether (OSP) described in Example 1 (350 g) and polyphosphoric acid (52.5 g) were heated with stirring at a temperature of 95° C. for 22 hours. Water (2.7 g) was added and the reaction heated at 95° C. for a further 30 minutes. The product was allowed to cool and then 300 g was dissolved in toluene (200 g). This solution was washed with water (300 g). After settling/separation the water layer was discarded. The wash was repeated and the toluene removed to give a brown viscous liquid.

Product Analysis

Phosphorus = 1.67% (w/w)

Total Acid Number = 32 mg KOH/g

Analysis by $^{31}$P nmr showed the phosphorus in the product to be present as a mixture of:

| mono- and di-phosphate esters | 95 ± 5% (w/w) |
| phosphoric acid | 5 ± 5% (w/w) |

EXAMPLE 5

A mixture of a butanol started polymer of propylene oxide with mol. wt. approximately 1400 (a "standard B-PAG") (400 g) and phosphorus pentoxide (41.8 g) were heated with stirring at a temperature of 100° C. for 4 hours. The mixture was cooled to 95° C., for a further 2 hours. The product was a brown viscous liquid.

Product Analysis

Phosphorus = 2.9% (w/w)

EXAMPLE 6

A mixture of an oil soluble polyether (OSP) of the formula (III) $R^1X$ is dodecylphenol, $C_xH_{2x}O$ is propylene oxide, n is $11\pm2$, p is O, and $Z=H$ giving a composition $73\pm3\%$ propylene oxide and $27\pm3\%$ dodecylphenol) (350 g) and phosphorus pentoxide (55 g) were heated with stirring at a temperature of 115° C. for 6 hours. The product was cooled to 95° C., water (7 g) was added and the reaction heated at 95° C. for a further 3 hours. The product was allowed to cool and then 250 g was dissolved in a mixture of toluene (200 g) and iso-butanol (50 g). This solution was washed with water (300 g). After settling/separation the water layer was discarded. The wash was repeated and the toluene removed to give a brown viscous liquid.

Product Analysis

Phosphorus = 1.7% (w/w)

Total Acid Number = 31 mg KOH/g

Analysis by $^{31}$p nmr showed the phosphorus in the product to be present as a mixture of:

| | |
|---|---|
| mono- and di-phosphate esters | 95 ± 5% (w/w) |
| phosphoric acid | 5 ± 5% (w/w) |

(B) Performance Testing
Cameron-Plint Studies on Automotive Formulations

The Cameron-Plint apparatus is used to model the friction/wear and/or scuffing performance of a lubricant in different parts of an engine. Two tests are generally performed, one to model piston ring-cylinder bore (ring zone) friction/wear, and another to model valve-train (cam & tappet) scuffing/wear.

Some ring zone friction results are given in Table 1; a low friction coefficient is desirable.

TABLE 1

| | Ring Zone Friction Test Results | | |
|---|---|---|---|
| Base Oil | Anti-wear Additives | Friction 120° C. | Coefficient 180° C. |
| 70% OSP 30% Polyol ester | ZDDP - 0.12% P (w/w) | 0.106 | 0.110 |
| 70% OSP 30% Hydrocracked mineral oil | ZDDP - 0.12% P (w/w) | 0.112 | 0.110 |
| 70% OSP 30% Poly-alpha-olefin | ZDDP - 0.12% P (w/w) | 0.110 | 0.112 |
| 70% OSP 30% Polyol ester | OSP Phosphate from Example 1 - 0.03% P (w/w) | 0.105 | 0.106 |
| 70% OSP 30% Polyol ester | OSP Phosphate from Example 2 0.12% P (w/w) | 0.090 | 0.081 |
| Mobil 1 (Retail) | ZDDP - 0.14% P (w/w) | 0.119 | 0.112 |

The OSP used in the above tests was the OSP starting material as described in Example 1; the polyol ester used was Priolube 3932 (ex Unichema). The ZDDP—Zinc Dialkyldithiophospate was based upon a secondary $C_3/C_6$ mixed alcohol.

It can be seen that in an OSP/Priolube 3932 Polyol Ester base fluid, the OSP Phosphate gives a lower friction coefficient than conventional zinc dialkyldithiophosphate EP/Antiwear additives, and that these lubricants have a lower friction coefficient than a high quality conventional synthetic multigrade motor oil (Mobil 1).

Some valve train wear results are given in Table 2 below, a fail load of 225N is the minimum level of performance required, and a high fail load is desirable.

TABLE 2

| | Valve Train Scuffing Test Results | |
|---|---|---|
| Base Oil | Anti-wear Additive | Fail Load (N) |
| 70% OSP 30% Polyol ester | ZDDP - 0.12% P (w/w) | 50 |
| 70% OSP 30% Polyol ester | ZDDP - 0.12% P (w/w) & OSP Phosphate from Example 1 - 0.03% P (w/w) | 225 |
| 70% OSP 30% Polyol ester | OSP Phosphate from Example 1 - 0.03% P (w/w) | 250 |
| 70% OSP 30% Polyol ester | OSP Phosphate from Example 2 - 0.03% P (w/w) | 250 |
| 70% OSP 30% Polyol ester | OSP Phosphate from Example 2 - 0.06% P (w/w) | 450 |
| 70% White Oil | OSP Phosphate from Example 2 - 0.12% P (w/w) | >500 |
| Mobil 1 (Retail) | ZDDP - 0.14% P (w/w) | 475 |

The OSP, Polyol ester and ZDDP used are as detailed under Table 1.

It can be seen that the OSP Phosphate ester performs considerably better than conventional zinc dialkyldithiophosphate EP/Antiwear additives in this system, and white oil. Use of the OSP Phosphate ester also allows for the possibility of lowering the phosphorus content of the finished lubricant.

Engine Tests on Automotive Formulations

An SAE 10W-40 multigrade engine oil was formulated using a base oil consisting of 500N and hydrocracked mineral oil with an olefin copolymer polymethacrylate VI improver, and an SG additive package wherein the zinc dialkyldithio-phosphate anti-wear additive was replaced by the OSP Phosphate from Example 2 to give 0.06% P (w/w) in the finished oil. This oil was run in two industry tests, namely the Daimler Benz MI102E Sludge and Wear test and the Petter W-1 extended Oxidative Stability test.

| Daimler Benz M102E Sludge and Wear Test (225 hours) | | |
|---|---|---|
| | 10W-40 with OSP Phosphate | Reference Oil for the test |
| Engine Sludge Rating (10 = Clean) | 9.24 | 8.10 |
| Average Cam Shaft Wear (Microns) | 2.4 | 15.0 |

| Petter W-1 extended Oxidative Stability Test (108 hours) | | | | |
|---|---|---|---|---|
| | 10W-40 with OSP Phosphate @ | | | Limit for the test |
| | 36 h | 72 h | 108 h | |
| Piston Rating (10 = Clean) | | | 10 | >9.5 |
| Bearing Weight Loss (mg) | 6 | 20 | 27 | <25 @ 36 h |
| Viscosity Increase (%) | 0 | 51 | 48 | <50 @ 36 h |

It can be seen that the OSP Phosphate containing lubricant performs effectively.

Four-Ball Wear Studies

This test (IP 239) measures the diameter of the wear scar caused by rotating a ball bearing against three fixed ball bearings for 1 hour under a load of 40 Kg. The smaller the scar, the better. The performance of a range of commercial EP/Antiwear additives, the OSP Phosphates from Examples 1, 2 3, 4, 6 and the standard PAG Phosphate from Example 5 in a variety of base fluids is summarized in Table 3.

TABLE 3

| | Four-Ball Wear Test Results | |
|---|---|---|
| Base Fluid | Additives | Wear Scar Diameter (mm) after 1 h @ 40 kg |
| OSP as detailed in Example 1 | none | 0.59 |
| OSP as detailed in Example 1 | 5.5% Hitec 370 (ex. Ethyl) | 0.44 |
| PAO 40 (poly-alpha-olefin) | 5.5% Hitec 370 (ex. Ethyl) | 0.40 |
| OSP as detailed in | 1.0% OSP Phosphate from | 0.48 |

TABLE 3-continued

Four-Ball Wear Test Results

| Base Fluid | Additives | Wear Scar Diameter (mm) after 1 h @ 40 kg |
|---|---|---|
| Example 1 OSP as detailed in Example 1 | Example 1 3.0% OSP Phosphate from Example 1 | 0.46 |
| 500N Mineral Oil | none | 0.68 |
| 500N Mineral Oil | 2.0% OSP Phosphate from Example 2 | 0.49 |
| 500N Mineral Oil | 2.0% OSP Phosphate from Example 3 | 0.37 |
| 500N Mineral Oil | 2.0% OSP Phosphate from Example 4 | 0.37 |
| 500N Mineral Oil | 2.0% PAG Phosphate from Example 5 | 0.62 |
| OSP as detailed in Example 1 | 2.0% PAG Phosphate from Example 5 | 0.59 |
| 500N Mineral Oil | 2.0% OSP Phosphate from Example 6 | 0.41 |

It can be seen that the OSP Phosphates gives similar performance to the commercial EP/Antiwear additives. In addition, removing the phosphoric acid impurity improves performance, (the product from Examples 3, 4 and 6 have significantly reduced levels of phosphoric acid compared to the product from Example 2). The OSP Phosphates also perform significantly better than the standard PAG phosphate in both mineral oils and OSP basefluids.

We claim:

1. A polyalkylene glycol ether phosphate ester, or salt thereof, having the formula:

$$R_w\text{---}P(O)(OH)_{3-w} \qquad (I)$$

wherein w is an integer from 1 to 3, and
R is an oil-soluble polyether moiety having the formula:

$$R^1X[(C_xH_{2x}O)_n(C_yH_{2y}O)_p]_m \qquad (II)$$

wherein $R^1$ is either an alkyl or an alkyl phenyl group having from 7 to 30 carbon atoms,
X is either O, S, or N
x is an integer from 2 to 4,
y is an integer from 6 to 30,
m is 1 when X is O or S and m is 2 when X is N,
n and p are such that the polyether moiety contains between 1 and 35% by weight of ($C_yH_{2y}O$) units and between 35 and 80% by weight of ($C_xH_{2x}O$) units, and the molecular weight of the polyalkylene glycol moiety is between 500 and 5000.

2. A polyalkylene glycol ether phosphate ester or salt thereof as claimed in claim 1 wherein w is 1 or 2.

3. A polyalkylene glycol ether phosphate ester or salt thereof as claimed in claim 1 wherein X is O.

4. A polyalkylene glycol ether phosphate ester or salt thereof as claimed in claim 1 wherein the alkylene oxide units are randomly distributed in the backbone of the polyether moiety.

5. A polyalkylene glycol ether phosphate ester or salt thereof as claimed in claim 1 wherein x=3.

6. A polyalkylene glycol ether phosphate ester or salt thereof as claimed in claim 1 wherein y=12-16.

7. A polyalkylene glycol ether phosphate ester or salt thereof as claimed in claim 1 wherein the total number of units having the formula $C_xH_{2x}O$ is between 50 and 75% by weight of the ester or salt thereof.

8. A polyalkylene glycol ether phosphate ester or salt thereof as claimed in claim 1 wherein the total number of units having the formula $C_yH_{2y}O$ is between 5 and 25% by weight of the ester or salt thereof.

9. A polyalkylene glycol ether phosphate ester or salt thereof as claimed in claim 1 wherein the polyether moiety has a molecular weight in the range 800 to 2500.

10. A polyalkylene glycol ether phosphate ester or salt thereof as claimed in claim 1 wherein n is 27 to 33.

11. A polyalkylene glycol ether phosphate ester or salt thereof as claimed in claim 1 wherein p is 1.0 to 1.6.

12. A process for the production of a polyether phosphate ester of the formula (I), or a salt thereof, which process comprises reacting at a temperature of from 70° to 120° C. a polyether having the formula:

$$R^1X[(C_xH_{2x}O)_n(C_yH_{2y}O)_pZ]_m \qquad (III)$$

(wherein $R^1$, X, x, y, m, n and p are as defined in claim 1 and Z is either hydrogen or a hydrocarbyl group containing from 1 to 30 carbon atoms), with a phosphating agent and water, said phosphating agent and water being present in a molar ratio less than 1:1 so as to substantially avoid the formation of polyalkylene glycol pyrophosphate.

13. A process as claimed in claim 12 wherein the phosphating agent is at least one phosphorus compound selected from the group consisting of phosphorus pentoxide, phosphoric acid, polyphosphoric acid and phosphorus oxychloride.

14. A process as claimed in claim 13 wherein the phosphating agent is phosphorus pentoxide or polyphosphoric acid.

15. A process as claimed in claim 12 wherein the polyether to phosphating agent molar ratio is less than 1:1.

16. A polyalkylene glycol ether phosphate ester, or salt thereof as claimed in claim 1 wherein n is 27 to 33 and p is 1.0 to 1.6.

17. A process as claimed in claim 12 wherein n is 27 to 33 and p is 1.0 to 1.6.

* * * * *

UNITED STATES PATENT AND TRADEMARK OFFICE
CERTIFICATE OF CORRECTION

PATENT NO. : 5,414,103
DATED : May 9, 1995
INVENTOR(S) : ROBERT B. CRACKNELL and ANTHONY J. MOORE It is certified that error appears in the above-indentified patent and that said Letters Patent is hereby corrected as shown below:

In the Abstract, line 18, after "disclosed" change the comma (,) to a period (.)

Col. 1, l. 53, correct the spelling of the word "phenyl"

Col. 8, l. 22, insert a slant (/) between "copolymer" and "polymeth-".

Col. 8, l. 28, correct the designation "M102E"

Signed and Sealed this

Nineteenth Day of December, 1995

BRUCE LEHMAN

Attest:

Attesting Officer

Commissioner of Patents and Trademarks